July 28, 1959 E. WOLFENDALE 2,897,431

VOLTAGE STABILIZING CIRCUIT

Filed July 7, 1955

INVENTOR
ERIC WOLFENDALE
BY Fred M. Vogel
AGENT

United States Patent Office 2,897,431

Patented July 28, 1959

2,897,431

VOLTAGE STABILIZING CIRCUIT

Eric Wolfendale, Horley, England, assignor, by mesne assignments, to North American Philips Company, Inc., New York, N.Y., a corporation of Delaware

Application July 7, 1955, Serial No. 520,567

Claims priority, application Great Britain August 11, 1954

3 Claims. (Cl. 323—22)

Figure 1:
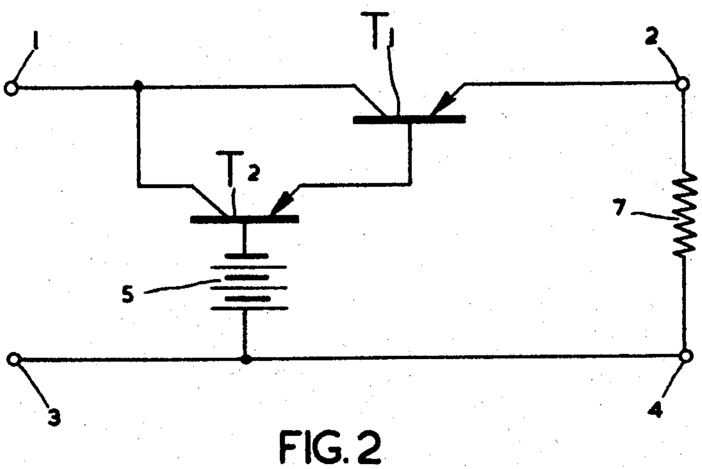

The present invention relates to voltage stabilizing circuit arrangements. More particularly, the invention relates to voltage stabilizing and like circuits capable of providing effective and reliable control of a source of D.C. supply in equipment which is to be left unattended for long periods.

The copending U.S. patent application, Serial No. 459,151, of Jan te Winkel, filed September 29, 1954, describes a stabilizing circuit comprising a transistor with its collector-emitter path connected in series between a D.C. supply to be controlled and a load, and a voltage reference source with one pole connected to the base of the transistor. The transistor is thus in a grounded collector circuit which has among other properties that of automatically maintaining the emitter at substantially the same potential as that of the base. In this case the voltage on the base is a constant reference voltage and, since the emitter tends to follow the base, the emitter provides a substantially constant or stabilized output voltage over a range of input voltages and/or load variations. Since the voltage required between emitter and base is very small, the reference source, which is preferably a reference battery, has a voltage chosen to be substantially equal to the desired stabilized output voltage.

In such a circuit the base-current drain on the reference source is small, but not small enough for convenient use with a reference source constituted by a battery in equipment which is to be left unattended for long periods. However, such current drain may be greatly reduced by use of the present invention.

According to the invention a stabilizing circuit comprises input terminals for connection to a D.C. supply to be controlled, output terminals for connection to a load, a transistor having an emitter-collector current gain approximately equal to unity with its collector-emitter path connected in series between one of said input terminals and the corresponding output terminal, the emitter being connected to the output terminal, a voltage reference source, and means controlled by said reference source for supplying to the base of said transistor base-current at a substantially constant stabilized voltage which current is in excess of the current supplied by said reference source.

Preferably the means controlled by the reference source comprise a second transistor of the same conductivity type as the first, also having an emitter-collector current gain approximately equal to unity, in a grounded collector circuit with its base-emitter path interposed between the base of the first transistor and the reference source. The second transistor acts in effect as a current divider since its emitter-collector current is the base current ($I_{b1}$) of the first transistor. The base current ($I_{b2}$) supplied to the second transistor by the reference source is thus $\alpha$ times smaller, i.e. $I_{b2}=I_{b1/\alpha'}$, where $\alpha'$ is the base-collector current gain.

Figure 2:
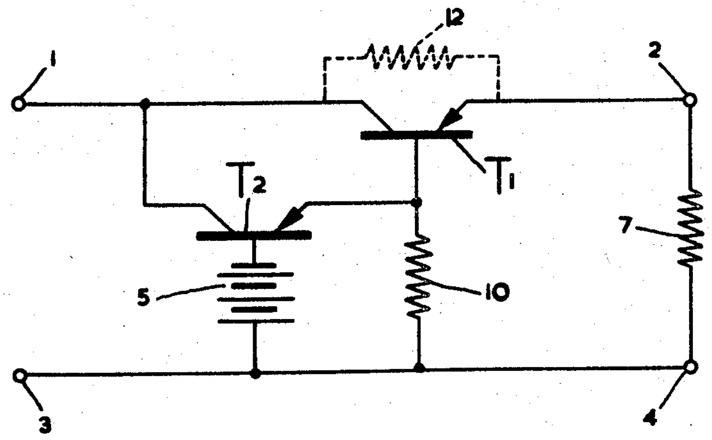

Specific embodiments of the circuit arrangement of the present invention will now be described by way of example with reference to the accompanying drawing, wherein:

Fig. 1 is a schematic diagram of an embodiment of the circuit arrangement of the present invention; and Fig. 2 is a schematic diagram of another embodiment of the circuit arrangement of the present invention.

Corresponding elements of Figs. 1 and 2 are indicated by the same reference numerals.

Referring to Fig. 1, the collector-emitter path of a first PNP junction transistor T1 is connected in series between an input terminal 1 and an output terminal 2. A second similar transistor T2 has its emitter-collector path connected in series in the base circuit of transistor T1 and its base connected to the other input terminal 3 and the other output terminal 4 through a reference battery 5. A load 7 is indicated as a resistance between the output terminals 2, 4.

The operation of the circuit will now be explained in greater detail, but the properties of a grounded-collector circuit will first be summarized as follows:

(*a*) The ratio of output or emitter current to input or base current is approximately $\alpha'$.

(*b*) The ratio of generator plus base impedance to output impedance is also approximately $\alpha'$.

(*c*) The emitter voltage is always very nearly equal to the base voltage.

Hence in the circuit of Fig. 1 the current drain on the battery is approximately the load current $I_L$ divided by $\alpha'_1\times\alpha'_2$ and the output impedance is approximately the generator plus base impedance of T2, divided by $\alpha'_1\times\alpha'_2$ plus the input impedance of T1 divided by $\alpha_1$.

The accurate expression for the current drain ($I_{b2}$) on battery 5 is:

$$I_{b2}=\frac{I_L}{\alpha'_1\alpha'_2}-\frac{I_{CO^1}}{\alpha'_1}-I_{CO^2}$$

where $I_{CO^1}$, $I_{CO^2}$ is the collector current which flows when the respective transistor is cut off, i.e. when the emitter current is zero. This current flows into the base in the opposite direction to the normal base current flow. The reversal of current takes place when the load current falls below a value substantially equal to $\alpha'\times I_{CO^1}$. Hence for all load currents below this value, transistor T2 will attempt to pass current in the reverse direction and will cut off. When T2 cuts off, impedance between base and emitter becomes very high, for example, 2 to 3 megohms, and stabilization is lost.

The circuit of Fig. 1 provides satisfactory control so long as the current $I_L$ determined by the load does not drop below the aforesaid value approximately equal to $\alpha'\ I_{CO^1}$. This may be explained by assuming that the current $I_1$ is gradually reduced. The base current $I_{b1}$ will drop proportionally and, as was observed previously, such current is also the emitter-current of transistor T2. Due to the $I_c/I_b$ characteristic curve of the transistor T2, the current $I_{b1}$ will reach a value at which the base current $I_{b2}$ of transistor T2 must reverse in direction and thus start to charge the reference battery 5. At this stage control is still maintained and no current is supplied by the reference source 5 since the latter is being charged. However, if the load current is further reduced it will reach a value at which the base current $I_{b1}$ of transistor T1 will approach the value zero. Beyond this stage the control action of the system will cease, since the base current $I_{b1}$ cannot in fact reverse due to the presence in its circuit of the diode junction in the emitter-collector path of transistor T2. This junction will suddenly present a backward resistance of the order of 2 to 3 megohms as against its normal or forward resistance of 50–100 ohms.

In order to obviate this disadvantage and to extend the control range, a resistor 10 may be connected between the emitter of transistor T2 and the terminal of battery 5 remote from transistor T2, as shown in Fig. 2. This ensures that the base current $I_{b1}$ can reverse without necessitating reversal of the emitter-current of transistor 2 which now has a second path through resistor 10 in addition to the path through the base of transistor T1. Thus by a suitable choice of the resistance value of resistor 10, it may be ensured that transistor T2 is never cut off even when the load current drops to zero. Thus the control action is maintained throughout a range of load currents extending from zero load current. The resistance value of resistor 10 should be so chosen that it takes a current not less than the maximum reverse base current $I_{b1}$ of transistor T1.

The regulating circuit behaves as if the load were supplied from a source of the same voltage as reference battery 5 and zero internal impedance, having in series with it an output impedance $R_0$ which is very low and is equal to $$R_0=r_{e1}+\frac{r_{b1}+r_{e2}}{\alpha'_1}+\frac{r_{b2}}{\alpha'_1\alpha'_2}$$

This very low output impedance permits the achievement of very good regulation and very constant output voltage.

If desired, a resistance 12 may be connected across the emitter-collector path of transistor T1 to permit larger currents to be taken by the load 7. However, with this arrangement the load must always take a minimum current determined by the input and output voltages and the value of resistance 12.

It will be appreciated that one or more additional grounded-collector transistor stages may be arranged between transistors T1 and T2, particularly if it is desired to allow for heavy load currents. Moreover, whereas circuits in accordance with the invention are intended principally for the control of low-voltage supplies of the order of 1 to 20 volts, supplies of higher voltage may be controlled by correspondingly raising the voltage of the reference source.

What is claimed is:

1. A circuit arrangement for stabilizing the voltage applied to a load by a source of D.C., said D.C. source and said load each having two terminals, comprising a transistor having emitter, collector and base electrodes, a collector-emitter path and an emitter-collector current gain substantially equal to one, means for connecting said collector-emitter path in series between one of the terminals of said D.C. source and one of the terminals of said load, said emitter being connected to said load, a voltage reference source interposed between said base and the other of the terminals of said D.C. source and said load, and means connected to said D.C. source terminal and interposed between said base and said reference source for directly controlling the magnitude of the current supplied to said base by said D.C. source to provide a substantially constant stabilized voltage, said last-mentioned means supplying a current to said base which is substantially greater in magnitude than that supplied by said reference source.

2. A circuit arrangement for stabilizing the voltage applied to a load by a source of D.C., said D.C. source and said load each having two terminals, comprising two transistors each having emitter, collector and base electrodes, a collector-emitter path and an emitter-collector current gain substantially equal to one, means for connecting the collector-emitter path of the first of said transistors in series between one of the terminals of said D.C. source and one of the terminals of said load, the emitter of said first transistor being connected to said load, means for connecting the collector-emitter path of the second of said transistors between said D.C. source terminal and the base of said first transistor, and a voltage reference source connected between the base of said second transistor and the other terminals of said D.C. source and said load thereby providing a substantially constant stabilized voltage, said second transistor supplying a current to the base of said first transistor which is substantially greater in magnitude than that supplied by said reference source.

3. A circuit arrangement for stabilizing the voltage applied to a load by a source of D.C., said D.C. source and said load each having two terminals, comprising first and second transistors each having emitter, collector and base electrodes and an emitter-collector current gain substantially equal to one, means for connecting one of the terminals of said D.C. source to the collector of each of said transistors, means for connecting the emitter of said first transistor to one of the terminals of said load, means for connecting the base of said first transistor to the emitter of said second transistor, a voltage reference source connected between the base of said second transistor and the other terminals of said D.C. source and said load thereby providing a substantially constant stabilized voltage, said second transistor supplying a current to the base of said first transistor which is substantially greater in magnitude than that supplied by said reference source, and a resistor connected between the emitter of said second transistor and the other terminal of said load.

References Cited in the file of this patent

UNITED STATES PATENTS

| | | |
|---|---|---|
| 2,519,377 | Jenkins | Aug. 22, 1950 |
| 2,535,355 | Froman | Dec. 26, 1950 |
| 2,693,568 | Chase | Nov. 2, 1954 |
| 2,698,416 | Sherr | Nov. 28, 1954 |